US009317741B2

(12) United States Patent
Guigues et al.

(10) Patent No.: US 9,317,741 B2
(45) Date of Patent: Apr. 19, 2016

(54) THREE-DIMENSIONAL OBJECT MODELING FITTING AND TRACKING

(71) Applicant: SOFTKINETIC SOFTWARE, Brussels (BE)

(72) Inventors: Laurent Guigues, Brussels (BE); Antoine Rennuit, La Madeleine (FR); Jeremie Roy, Brussels (BE)

(73) Assignee: SOFTKINETIC SOFTWARE, Brussels (BE)

( * ) Notice: Subject to any disclaimer, the term of this patent is extended or adjusted under 35 U.S.C. 154(b) by 84 days.

(21) Appl. No.: 14/119,406

(22) PCT Filed: May 16, 2013

(86) PCT No.: PCT/EP2013/060196
§ 371 (c)(1),
(2) Date: Nov. 21, 2013

(87) PCT Pub. No.: WO2013/186010
PCT Pub. Date: Dec. 19, 2013

(65) Prior Publication Data
US 2014/0334670 A1    Nov. 13, 2014

(30) Foreign Application Priority Data

Jun. 14, 2012  (EP) .................................... 12172091

(51) Int. Cl.
*G06K 9/00*  (2006.01)
*G06T 7/20*  (2006.01)
(Continued)

(52) U.S. Cl.
CPC .............. *G06K 9/00342* (2013.01); *G06K 9/44* (2013.01); *G06K 9/469* (2013.01); *G06K 9/6232* (2013.01);
(Continued)

(58) Field of Classification Search
None
See application file for complete search history.

(56) References Cited

U.S. PATENT DOCUMENTS 8,175,374 B2 *  5/2012  Pinault et al. ................. 382/154
9,047,507 B2 *  6/2015  Gurman et al.
(Continued)

FOREIGN PATENT DOCUMENTS

WO  2010088034  8/2010

OTHER PUBLICATIONS

Chun et al., "3D star skeleton for fast human posture representation", World Academy of Science, Engieering and Technology 44 2008.*
(Continued)

*Primary Examiner* — Soo Park
(74) *Attorney, Agent, or Firm* — Koppel, Patrick, Heybl & Philpott

(57) ABSTRACT

Described herein is a method and system for marker-less three-dimensional modelling, fitting and tracking of a skeletal representation of an object in a three-dimensional point cloud. In particular, it concerns the tracking of a human user skeletal representation with respect to time. The method comprises inputting a three-dimensional point cloud derived from a depth map; predetermining a set of control points representing the skeleton of the user, determining a start-up skeleton pose, obtaining an orthographic representation of the user 3D point cloud projected onto a grid by sampling the 3D point cloud with a predetermined static size, determining a set of curvature centers points approximating central axes of main parts of the user, determining the torso plane, and refining and/or defining the principal direction of the body. The method comprises then the step of performing iterative local and global fittings of the set of control points onto the user 3D point cloud and the associated data such as the curvature center points, using topological and geometric constraints so that to track skeleton posture along the time. Stabilizing the skeleton pose; resolving ambiguities; and providing a suitable output are then the last steps of a preferred embodiment of the invention.

30 Claims, 7 Drawing Sheets

ORUS = Orthographic User grid

(51) Int. Cl.
*G06K 9/62* (2006.01)
*G06K 9/44* (2006.01)
*G06K 9/46* (2006.01)

(52) U.S. Cl.
CPC ..... *G06T 7/2046* (2013.01); *G06T 2207/10028* (2013.01); *G06T 2207/20044* (2013.01); *G06T 2207/30196* (2013.01)

(56) References Cited

U.S. PATENT DOCUMENTS

| | | | |
|---|---|---|---|
| 2005/0265583 | A1 | 12/2005 | Covell et al. |
| 2010/0111370 | A1* | 5/2010 | Black et al. ................. 382/111 |
| 2011/0292036 | A1 | 12/2011 | Sali et al. |
| 2012/0218395 | A1* | 8/2012 | Andersen et al. ............. 348/77 |
| 2013/0286012 | A1* | 10/2013 | Medioni et al. .............. 345/420 |
| 2014/0072175 | A1* | 3/2014 | Hasler et al. ................. 382/103 |

OTHER PUBLICATIONS

Chen et al., "Human action recognition using star skeleton", VSSN 2006.*

Tagliasacchi et al., "Curve skeleton extraction from incomplete point cloud", ACM Transactions on Graphics, vol. 27, No. 3, Article 71, Publication date: Aug. 2009.*

Wu et al., "Capturing articulated human hand motion: a divice-and-conquer approach", Computer Vision, 1999. The Proceedings of the Seventh IEEE International Conference on , vol. 1, No., pp. 606,611 vol. 1, 1999.*

European Patent Office International Search Report and Written Opinion dated Aug. 6, 2013, International Application No. PCT/EP2013/060196 (9 pages).

Ye et al., "Accurate 3D Pose Estimation From a Single Depth Image", 2011 IEEE International Conference on Computer Vision, pp. 731-738, Nov. 6, 2011 (8 pages).

* cited by examiner

ORUS GRID & Osculating sphere

Osculating sphere

ORUS = Orthographic User grid

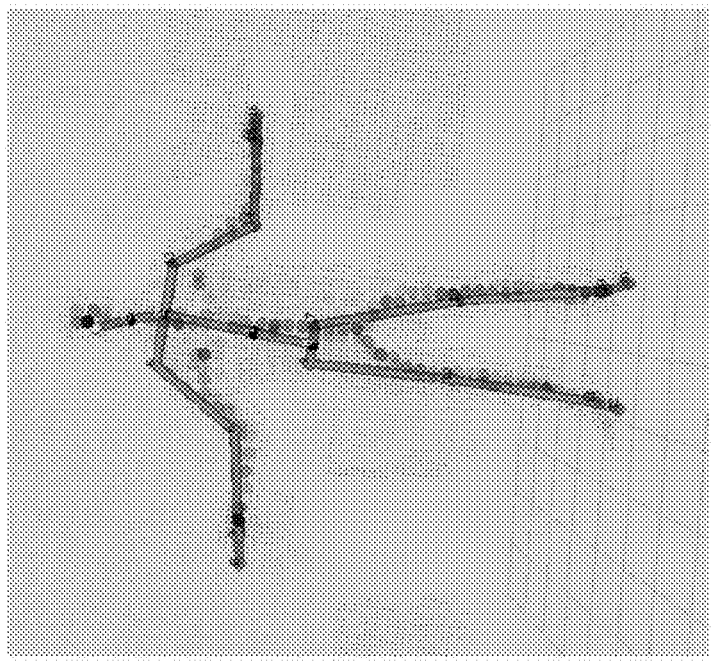
Fig. 7e — Osculating sphere & skeleton model
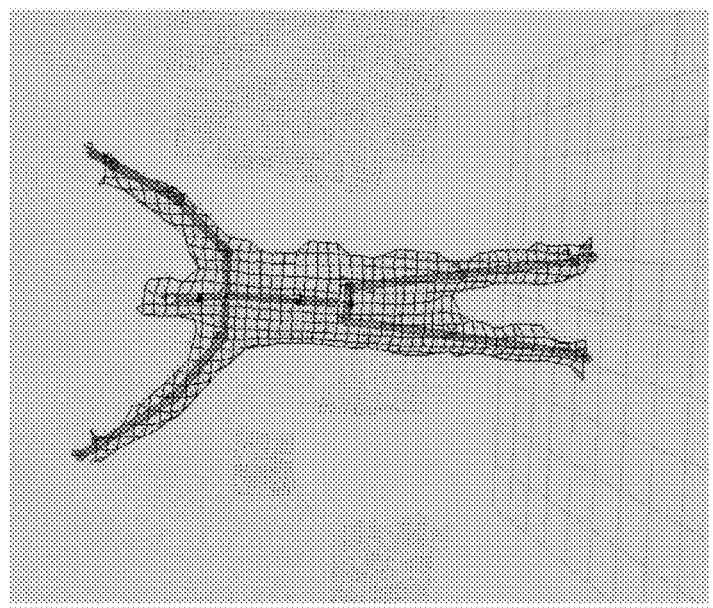
Fig. 7d — ORUS grid & skeleton model

THREE-DIMENSIONAL OBJECT MODELING FITTING AND TRACKING

FIELD OF THE INVENTION

The present invention relates to three-dimensional object modelling, and is more particularly concerned with a method of modelling, fitting and tracking of objects, and, in particular, although not exclusively to, determining, fitting and tracking a skeletal representation of a user in a temporal sequence of depth maps captured by a three-dimensional imaging system.

BACKGROUND TO THE INVENTION

Three-dimensional (3D) imaging systems, such as, stereo-vision cameras, time-of-flight (TOF) cameras and structured-light cameras, produce a temporal sequence of depth maps which are 2D images providing at least X, Y, Z coordinates for each imaged point of a scene. The X and Y coordinates may indicate the horizontal and vertical position of the pixel in the camera sensor matrix array, and the Z coordinate may indicate the distance of the imaged point in the scene to the imaging device. Alternatively, each imaged point of a scene may comprise X, Y, Z coordinates corresponding to its location in a 3D space, the coordinates being expressed with respect to a 3D coordinate system having an origin, for example, at a reference point. The camera location may be selected as the reference point in order to specify a camera coordinate system. However, the imaged points of a scene may also be expressed in other 3D coordinate systems where the reference point is not set at the camera location, but is determined to be at a point location in the real world scene being imaged such that the X, Y, Z coordinates of each imaged point of the scene represents a real position in a so-called world coordinate system. Conversions between the real world and camera coordinate systems, including certain limits, can simply be performed by applying a mathematical transformation using, for example, a calibration matrix, in order to perform a geometric projection of the particular 3D coordinates.

Whatever coordinate system is used, the produced depth maps may then be processed in order to detect, localise, track, segment, and analyse objects, including articulated human bodies or animal bodies, namely, the users, in the scene using specific 2D or 3D analysis methods such as described in WO-A-2011/080282. One result of such a method may, in particular, assist in defining a set of 3D points as being the ones that represent, in the virtual world, each body or object in the real scene.

Processing such a 3D point cloud representing an object or at least a body of a user over time allows mapping, fitting and tracking of a model or of other kinds of representations of the object or body. For example, a skeletal representation of a human body, or of an object, may be mapped, fitted and tracked in order to monitor or control the corresponding virtual representation of the object or body in a virtual environment with respect to movements of the object or user in the real world. This is termed motion capture.

In prior art image processing techniques, the usual method for tracking a skeleton within a scene requires the use of markers associated with a user whose skeleton is to be tracked, the markers being tracked rather than the user himself/herself. In some instances, these markers are attached to a suit or to another item that is worn by the user.

More recently, range imaging devices output data, namely, depth maps, started to be used for marker-less skeletal tracking. Using such imaging devices, the tracking relies on 2D or 3D motion detection and on some estimation techniques, mixed with body part recognition using pattern matching techniques. In addition, pose recognition and estimations also mainly uses matching techniques with a model.

In US2010/0034457, a computer-implemented method for modelling humanoid forms from depth maps is disclosed. More specifically, the method includes receiving a depth map of a scene containing a body of a humanoid subject. The depth map includes a matrix of pixels, each pixel corresponding to a respective location in the scene and having a respective pixel value indicative of a distance from a reference location to the respective location. The depth map is segmented so as to find a contour of the body which is subsequently processed in order to identify a torso and one or more limbs of the considered subject. By analysing a disposition of at least one of the identified limbs in the depth map, input signals are generated to control an application program running on a computer.

In US-A-2011/0052006, a method is described for extracting a skeleton from a depth map. The method includes receiving a temporal sequence of depth maps of a scene containing a humanoid form having a head. The depth maps include a matrix of pixels having respective pixel depth values. A digital processor processes at least one of the depth maps so as to find a location of the head and estimates dimensions of the humanoid form based on the location thereof, the humanoid standing in a calibration pose or posture. The processor tracks movements of the humanoid form over the sequence using the estimated dimensions, body parts identifications and motion estimation methods.

In US-A-2010/0194872, systems and methods for capturing depth information of a scene are used to process a human input. A depth image of a scene is captured by an imaging device. The image capture is dependent of the orientation of the camera with respect to the scene. The depth image is then analysed to determine whether the depth image includes both human and non-human targets. For example, the depth image may include one or more targets including a human target and some non-human targets. According to one embodiment, each target is flood-filled and compared to a pattern to determine whether the target is a human target or not. If one or more of the targets in the depth image comprises a human target, the human target is scanned, and a skeletal model of the human target is generated based on the scan of a binary mask of the human target from which body parts are identified.

In US-A-2011/0249865, an image processing based method for tracking marker-less motions of a subject in a three-dimensional (3D) environment is disclosed wherein input images comprising depth information is included. The method utilises two-dimensional (2D) lower and higher body parts detection units using movement detection principle. These detection units are associated with several 3D body part detection units using lower and higher body part models to localise, in the space, individual candidates for each of the 3D body parts. A model rendering unit is used to render the complete model in accordance with some predicted body pose.

In US2011/0292036, a method using a depth sensor with an application interface is disclosed. The method comprises performing data processing on a depth map of a scene containing a body of a humanoid subject. In a similar method to that used in US2010/0034457 discussed above, the depth map includes a matrix of pixels, each pixel corresponding to a respective location in the scene and having a respective pixel depth value indicative of a distance from a reference plane to the respective location. The depth map is then processed in a digital processor to extract a skeleton of at least a part of the body of the humanoid subject, the skeleton including multiple joints having respective coordinates and comprising at least two shoulder joints having different, respective depth values which are used for defining a coronal plane of the body that is rotated by at least 10° relative to a reference plane. An application program interface (API) indicates at least the coordinates of the joints.

In US2011/0211754, a method for tracking body parts by combined colour image and depth processing is disclosed. This method relies on image processing techniques and includes receiving a depth image of a scene containing a human subject and receiving a colour image of the scene containing the human subject. A part of a body of the subject is identified in at least one of the images. The quality of both the depth image and the colour image is evaluated, and in response to the quality, one of the images is selected to be dominant in processing of the part of the body in the images. The identified part is localised in the dominant image, while using supporting data from the other image.

Despite some existing method disclose skeleton mapping according to some specific embodiments, one important concern not properly addressed is when using a depth map or a corresponding 3D point cloud representing each imaged point of a scene so that to provide a robust and efficient method having a processing time independent of the native depth map resolution, in particular, when full processing of a raw depth map to a robust and efficient fitted skeleton is to be performed in real time on low-end hardware platforms.

Additionally, there is no disclosure of any object fitting and tracking method that is capable of handling occlusion of segments and of accommodating joint limits, velocity constraints, and collision constraints at the same time. Moreover, none of the existing methods are able to recover from posture errors while being morphology agnostic to the user or to the object being tracked. Furthermore, none of the existing methods make use of an estimation of central axes of parts of an object to improve the fitting and tracking of its skeletal representation, or of multi-criteria iterative energy minimisation for the fitting process.

SUMMARY OF THE INVENTION

It is therefore an object of the present invention to provide a method for creating, fitting and tracking a skeletal representation of an object, without the need for markers attached to that object.

It is another object of the present invention to use a projection in an orthographic projection space of the 3D point cloud corresponding to the object to be fitted and tracked to optimise the fitting and tracking of its skeletal representation.

It is another object of the present invention to provide a method for determining, fitting and tracking a skeletal representation of an object using a depth map, and which makes use of an estimation of central axes of parts of the object as seed information to perform the fitting.

It is a further object of the present invention to provide a robust and efficient method for determining, fitting and tracking the skeletal representation of an object using depth maps, the method being capable of handling occlusion of segments, joints limits, velocity constraints, collision constraints and error recovery while being morphology agnostic.

It is another further object of the present invention to provide efficient fitting and tracking of the skeletal representation of objects using, iteratively, multiple criteria energy minimisation methods at a local and at a global level.

In accordance with a first aspect of the present invention, there is provided a method of fitting and tracking a skeletal representation of an object within a three-dimensional scene represented by a three-dimensional point cloud, the skeletal representation comprising an arrangement of a plurality of control points, the method comprising the steps of:

a) using the three-dimensional point cloud of the scene to determine input information relating to the object to be fitted and tracked within the scene;

b) converting the determined three-dimensional point cloud of the object to be fitted and tracked within the scene into an orthographic representation;

c) determining curvature centre points to estimate a central axis position of at least one part of the object to be fitted and tracked;

d) determining the position of the plurality of control points representing the object to be fitted and tracked within the three-dimensional scene; and e) fitting and tracking the plurality of control points within the three-dimensional scene to refine the position of the skeletal representation of the object with respect to time.

The term "object" as used herein refers to inanimate objects or animate objects, which can be human beings, animals or robots.

The term "skeletal representation" as used herein refers to a set of control points representing an object, and the arrangement in space of which is defining the pose of the object to be fitted and tracked.

The method of the present invention has the advantage that it makes use of a particular skeletal representation of an object to be fitted and tracked, for example, a human user, within the three-dimensional scene, without having markers attached to the object, and that it is able to track that skeletal representation within the scene along time.

It will readily be understood that the term "tracking" refers to the relative movement of the object with respect to a three-dimensional imaging device, such as, a camera, that captures the three-dimensional scene. This means that stationary objects can also be tracked within the scene if the imaging device is moving relative to such objects, or, even without motion, if object is detected at least once during a period of time.

The considered skeletal representation in the present invention uses a set of control points. The number of control points that need to be processed in each frame captured by the imaging device can specifically be predefined in accordance with the object to be fitted and tracked as well as in accordance with the processing power of the system performing the method, or in accordance with the accuracy in the body segment to be represented. For example, for a human user, thirteen control points are considered to be a relevant exemplary of a human skeleton representation. The number of control points can thus be predetermined if considering that the object to be fitted and tracked will always be of the same type over time, for example, if the system is always used to fit and track skeletal representations of human beings. However, recognition methods can also be used to automatically identify the detected objects in the scene, and then to set the optimal skeletal representation including the setup of the number of control points and their arrangement, accordingly to the identified one to be considered as of interest for the fitting and the tracking. For example, a system may be required to fit and track skeletal representations of human beings and robots within a single scene over time. The system detects, recognises and differentiates objects corresponding to human beings from those corresponding to robots, and sets accordingly, for each single object, the correct skeletal representation.

It will also be understood that preferably, each of steps c), d) and e) comprises using the orthographic representation.

In one embodiment, the three-dimensional point cloud may be derived from a depth map of the three-dimensional scene. In another embodiment, the input information may additionally comprise a normal map determined for each point in the three-dimensional point cloud. In a further embodiment, the input information may comprise a combination of the depth map and of the normal map. In one another further embodiment, input information may comprise a determined skeletal representation corresponding to the known object to be fitted and tracked.

Furthermore, step a) may also comprise determining at least one object of interest from the three-dimensional point cloud. This may further include determining a principal direction of the object to be fitted and tracked. This may additionally comprising in another embodiment, automatically recognizing the object to be fitted and tracked and determining a skeletal representation of this object accordingly if several kind of objects have to be fitted and tracked in the scene.

In one preferred embodiment, step a) may comprise determining an initial arrangement, in space, of the positions of the control points which define a representation of a skeletal pose of the object to be fitted and tracked, when no object has previously been fitted and tracked.

Preferably, step b) comprises projecting the three-dimensional point cloud of the object to be fitted and tracked into a grid, the grid comprising a plurality of grid bins each having a predetermined size, the projection sampling the three-dimensional point cloud of the object with a predetermined static size in space.

Additionally, step b) comprises accumulating and weighting information relating to each point in the three-dimensional point cloud in the grid bin with which it is associated. In one embodiment, the method further comprises, where a grid bin is empty, filling it with interpolated information from neighbouring populated grid bins.

Preferably, step c) comprises determining object parts curvature centre points, the position of which being estimated by using normal data preferably provided by the grid bins of the orthographic representation.

Step c) may further comprise associating each curvature centre point with an osculating sphere to approximate a volume of the central axis of each part of the object to be fitted and tracked.

Preferably, step c) comprises associating each curvature centre point and its associated osculating sphere with a tag indicating the convexity of the surface of each part of the object to be fitted and tracked with which they are associated. The convexity of the surface may be classified as being one of: a flat surface, a concave surface and a convex surface. In particular, the flat surface may correspond to a torso of a human user and the convex surface may correspond to a part of a limb of a human user. The concave surface may not be considered as always relevant especially when considering efficient human skeletal fitting and tracking.

Preferably, step d) comprises determining the position of the control points using the skeletal representation set in a previous frame if object was previously fitted and tracked, or using the initial skeletal representation determined in step a) if no object was fitted and tracked before.

Advantageously, step d) comprises further the step of:—
d1) fitting at least one segment between each pair of adjacent control points.

In addition, step d) may further comprise the step of:—
d2) identifying a plane in the object.

Furthermore, step d2) may further comprise the step of:—
d3) identifying a plane in the three-dimensional point cloud of the object to be fitted and tracked using convexity tags.

Moreover, step d) may further comprise the steps of:—
d4) identifying a principal direction of the object;
d5) identifying the position of at least one part of the object; and
d6) refining the position of each part of the object and the principal direction with respect to one another.

In one preferred embodiment where the object is a animated object, for example, a human user, step d2) may comprise identifying the plane as the torso and step d5) may comprise identifying a body part which corresponds to the head.

In one embodiment, step e) comprises utilising properties of identified control points to fit the position of the skeletal representation to be tracked. The utilised properties may include at least one of: position, velocity, acceleration and probability factors determined with respect to time.

In addition, step e) may comprise utilising a combination of local and global energy minimisation strategies for iteratively fitting the pose of the skeletal representation of the object with respect to time. Such energy minimisation strategies may include at least one criterion among: distance to matter; distance to previous skeleton, and distance to silhouette. Preferably, the energy minimisation strategies use all of distance to matter; distance to previous skeleton and distance to silhouette criteria.

Step e) may further comprise evaluating a plurality of possible control point positions in accordance with a probability factor determined with respect to time to optimise the result of the fitting and tracking. In a preferred embodiment, step e) comprises iteratively performing both local and global energy minimisation in accordance with at least one predetermined criterion.

Additionally, the energy minimisation strategies may be carried out using a gradient descent-type algorithm.

Furthermore, once the skeleton is tracked, each control point position may preferably be stabilised in a further step to avoid jerky unnatural representation of the movement of the skeleton.

In one further step, completion techniques may be used in order to generate a suitable position for the control points of the skeleton that were not successfully tracked. For example, such techniques may be used to compensate for tracking errors due to ambiguous known object postures and/or to populate the three-dimensional point cloud with missing parts of the skeleton after energy minimisation to compensate for parts of the skeleton not visible to the imaging device capturing the three-dimensional scene.

BRIEF DESCRIPTION OF THE DRAWINGS

For a better understanding of the present invention, reference will now be made, by way of example only, to the accompanying drawings in which:—

FIG. 7d illustrates the orthographic user grid of FIG. 7a in which the osculating sphere outline is replaced by a skeleton as a result of the fitting process in accordance with the present invention;

FIG. 7e illustrates a 3D point cloud corresponding to a user wherein curvature centre points are represented by a set of osculating spheres together with a fitted skeleton model in accordance with the present invention;

FIG. 8a illustrates a user centred radial distances computation principle using the user 3D point cloud centre of mass location as origin;

FIG. 8b illustrates a profile determined from the radial distances measured as illustrated in FIG. 8a.

DESCRIPTION OF THE INVENTION

Figure 1:
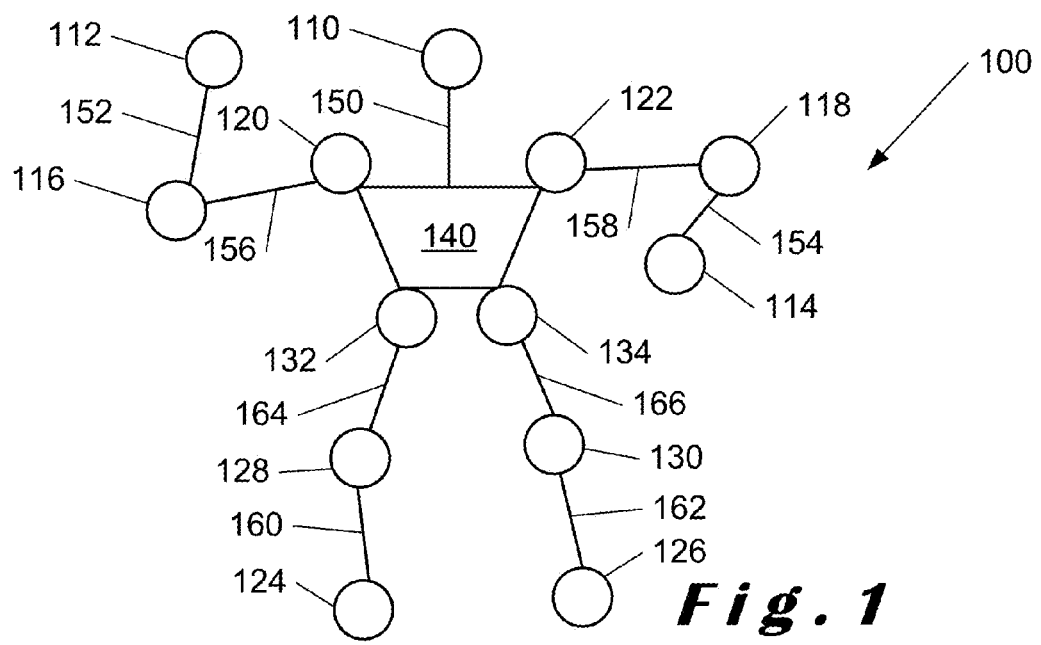
FIG. 1 illustrates a skeletal representation of a human body used for tracking in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

It also will be understood that, although the skeletal fitting and tracking method is described with reference to the skeleton of a human body, is not limited thereto and can be used with any other kind of object, regardless of whether it is animated or not and/or articulated or not.

FIG. 1 illustrates a skeletal representation 100 used for fitting and tracking a human being in a virtual environment. The skeletal representation 100 comprises a set of articulated rigid bodies in between a set of control points or joints having some constraints and a predetermined number of degrees of freedom. More specifically, the skeletal representation 100 may comprise thirteen control points 110, 112, 114, 116, 118, 120, 122, 124, 126, 128, 130, 132, 134 which define a patch 140 and nine segments 150, 152, 154, 156, 158, 160, 162, 164, 166 as shown. The patch 140 and the segments 150, 152, 154, 156, 158, 160, 162, 164, 166 can be considered to be ten solid portions or rigid bodies within the skeletal representation 100.

These solid parts and rigid bodies may comprise, for example, collision constraints that ensure that their representations are not allowed to intersect with one another in accordance with unnatural postures or poses. Each of the control points 110, 112, 114, 116, 118, 120, 122, 124, 126, 128, 130, 132, 134 may comprise only three degrees of freedom which can, for example, relate to freedom in their 3D positioning within the virtual environment.

It is to be noted that, in one particular embodiment in which a human skeleton is to be fitted and tracked, limiting the human skeletal representation to only thirteen control points each having three degrees of freedom, that is, their respective 3D position, makes possible to carry out more efficient fitting and tracking processing than when using a higher number of control points which may have three or more degrees of freedom, and while maintaining a realistic representation of the behaviour of the human skeleton. The higher the number of control points and/or the higher the number of degrees of freedom, the higher the complexity required for fitting the most realistic pose of these control points into a 3D point cloud that represents a user, with an accompanying slower rate of mathematical convergence to the best fitted pose solution. However, although the use of thirteen control points corresponds to a preferred embodiment for a skeletal representation of a human being, other suitable numbers of control points and/or degrees of freedom may be chosen depending on the articulated object to be tracked, for example, in accordance with the amount of articulation and the number of segments to be rendered, or in accordance with platform performance. For example, in another embodiment, a human skeletal representation may comprises seventeen control points so that to provide a better rendering of the limbs extremities, namely, each previous control point corresponding to a hand or to a foot being replaced by two control points which correspond to the ankle and the extremity of the foot and to the wrist and the extremity of the hand respectively.

In the particular embodiment of the human skeleton fitting and tracking using thirteen control points, each control point 110, 112, 114, 116, 118, 120, 122, 124, 126, 128, 130, 132, 134, each segment 150, 152, 154, 156, 158, 160, 162, 164, 166 and the patch 140 is mapped onto the points corresponding to the user in a 3D point cloud determined by a suitable 3D imaging device as described above.

The control points 110, 112, 114, 116, 118, 120, 122, 124, 126, 128, 130, 132, 134 effectively correspond to skeletal parts or joints: point 110 corresponds to the head; points 112, 114 correspond to the hands or wrists; points 116, 118 correspond to the elbows; points 120, 122 correspond to the shoulders; points 124, 126 correspond to the feet or ankles; points 128, 130 correspond to the knees; and points 132, 134 correspond to the hips.

The patch 140 comprises four control points 120, 122, 132, 134 connected together to define the torso, that is, the shoulders 120, 122 and the pelvic bones 132, 134.

The segments 150, 152, 154, 156, 158, 160, 162, 164, 166 correspond to an assembly between pairs of control points that are connected to one another with the exception of segment 150 which approximates the neck as it connects the head (point 110) with the torso (patch 140): segments 152, 154 correspond approximately to the lower arms between hands or wrists and elbows (points 112 and 116, and 114 and 118 respectively); segments 156, 158 correspond approximately to the upper arms between the elbows and shoulders (points 116 and 120, and 118 and 122 respectively); segments 160, 162 correspond approximately to the lower legs between feet or ankles and knees (points 124 and 128, and 126 and 130 respectively); and segments 164, 166 correspond approximately to the upper legs between knees and hips (points 128 and 132, and 130 and 134 respectively).

Figure 2:
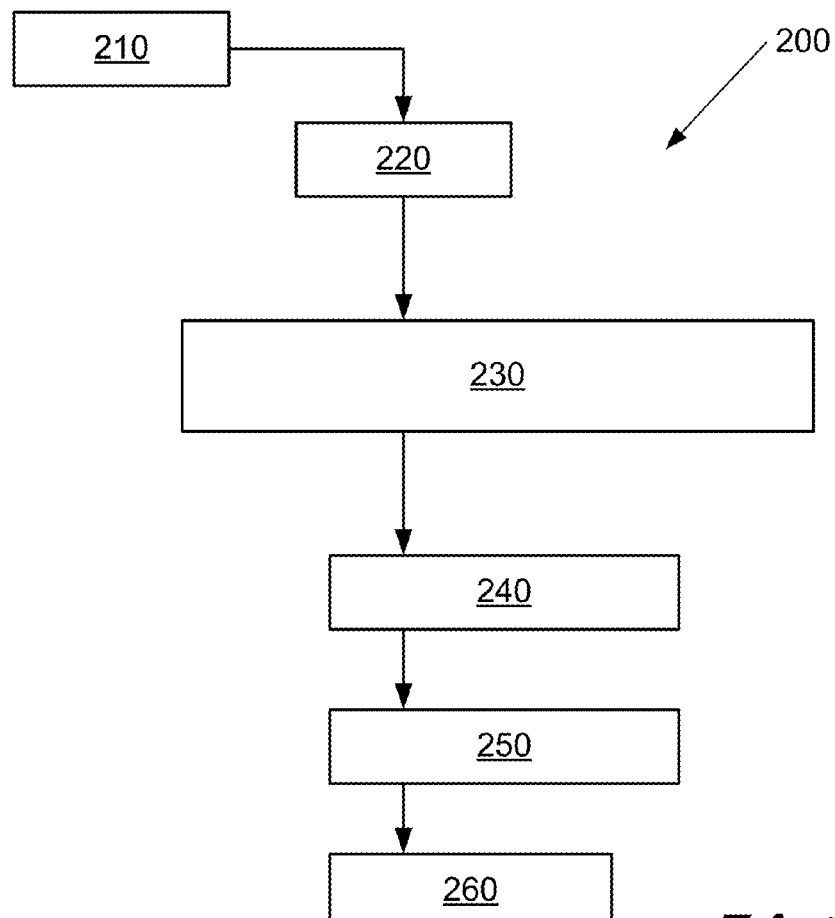
FIG. 2 illustrates a flow chart of a global human body skeletal tracking process in accordance with the present invention.

Referring now to FIG. 2, a flow chart 200 is shown which illustrates the steps in the process of providing a skeletal representation of a user moving freely over time within a 3D scene. The skeleton fitting and tracking is performed using a 3D point cloud provided by a 3D imaging system, and the skeleton representation is calculated so that it matches the real movements of the user over time. The first step, step 210 is an initialisation step in which input data, such as, a depth map imaging a user in the scene, the user mask and the corresponding user 3D point cloud, a potential user head location and a potential user principal direction location, are provided and refined. In particular, step 210 comprises the determination of the skeletal representation in terms of the number of control points and in terms of an arrangement of those control points in space according to the object to be fitted and tracked. The determination can be manually predefined if objects to be fitted and tracked are known and never change type over time, for example, when tracking human being within the scene and fitting their skeletal representation onto the 3D point cloud by which they are represented. The determination can also be automatically defined at runtime when an object of interest is detected, recognised and identified as being the one of interest among a plurality of known objects. For example, recognition methods from state of art, including but not limited to 2D and 3D matching techniques, may be used to identify different animate or inanimate objects within the scene. From the identification, the respective skeletal representations for the fitting and tracking may then be determined according to the objects to be considered as those being of interest.

Step 210 also includes a non-systematic determination of a basic initial pose of the determined skeletal representation in order to begin the fitting and tracking process. The term "non-systematic" means that such a raw or basic initial pose determination of the skeletal representation is carried only when the object is detected and when no previous skeletal representation is available. For example, if a human user is being tracked, the detection and localisation of the head may help in providing an initial principal direction of the human user. The principal direction can be considered to be a direction passing through the head and the centre of mass of the 3D representation of the user.

The determination of the principal direction of a human user can be achieved using the segmentation of the object of interest into a set of clusters such as that described in WO-A-2008/128568 where 3D image data, representing a plurality of points, each of which having at least a set of coordinates in a three-dimensional space, is captured using a 3D imaging system. The points are grouped to form a set of clusters, and, from the set of clusters, an object of interest is selected according to predetermined parameters, for example, in accordance with position, size and shape. The clusters relating to the object of interest are grouped into a set of sub-clusters in accordance with a further set of parameters, for example, position within the 3D space and/or colour. Each sub-cluster has a centroid in 3D space and by associating a volume with each centroid of these sub-clusters, a representation of the object of interest can be obtained. From such a representation and the positions of the sub-clusters, it is possible to estimate a principal direction, and also an initial pose for the skeletal representation of the object to be tracked, in this case, a human user. For example, that raw initial pose may consider the localisation of the extremities of the body, namely, the clusters being connected to one single other cluster and corresponding to the head, hands and feet, the positions of which being unambiguous due to the determined principal direction.

The initialisation step 210, as well as another pre-setting step 220, is performed before the actual fitting and tracking step 230. In particular, the presetting step 220 aims at generating specific features necessary for optimising the following fitting and tracking steps in the process, namely, it aims at performing an orthographic projection of the 3D point data embedded in the depth map in order to provide specific and mandatory input enabling a better fitting and tracking of the skeletal representation of the user over time in step 230.

Returning to the flow chart, the next step 230 corresponds to the fitting and tracking step of the skeletal representation. The following step, the stabilisation step 240, is then performed to disable jerky and discontinuous movement in the skeletal representations. A further completion step 250 is then performed to retarget control points to specific locations for a set of some potential ambiguous postures that may disturb the tracking, and an output refinement step 260 is finally performed to generate processed data output in compliancy with a predetermined set of specifications, for example, converting data relating to the skeletal representation into a metric system suitable for a specific application. As mentioned above, each imaged point of a scene may comprise X, Y, Z coordinates corresponding to its location in a 3D space, the coordinates being expressed with respect to a 3D coordinate system having an origin, namely, a reference point. The camera location may be selected as the reference point in order to specify a camera coordinate system. One example of converting the data may be between the camera coordinate system and a real world or Cartesian coordinate system.

Returning to initialisation step 210, input data may comprise a depth map, a user mask and/or a user 3D point cloud, a normal map extracted from the depth map, a principal direction of the user 3D point cloud, a head position extracted from another independent method, a set of points of interest, for example, the centroids (also referred to as "key points" herein) defined by a clustering method such as that described in WO-A-2008/128568, and a mass centre of the 3D point cloud.

As described above, a depth map provides distance data among other information. This distance data is usually embedded in the Z coordinate of each point of the 3D points in the 3D point cloud representing the scene captured by the depth sensing (or 3D imaging) camera device. The distance data corresponds to a distance measurement between each imaged point in the scene and another reference location in the scene which, for example, can be the camera device location, or another reference location predefined in the scene. The user mask or the corresponding user 3D point cloud is then determined to define precisely which pixels belong to the user or to the articulated object respectively whose skeleton is to be fitted and tracked. Such a determination can be carried out using a dedicated method such as the one described in detail in WO-A-2011/080282. In WO-A-2011/080282, a method of tracking an object is described in which pixels in a 3D point cloud are grouped into regions having a centroid and then those regions are grouped into clusters of interconnected regions. From the spatio-temporal properties of their interconnections, clusters are evaluated to determine if they belong to the same object and if the object is partially occluded by another cluster in a 2D projection.

The initialisation step 210 further comprises determining or refining a normal map that can directly be acquired from the input sensor if it supports it or computed from the depth map if not. In the latter case, the determined normal map may be extracted from the depth map by making use of horizontal and vertical gradients in the depth map with respect of a fixed size kernel as described below with reference to FIGS. 3 and 4. Other methods for determining a normal map are known which may include, for example, defining the normal of each central pixel belonging to plane fitted locally or to a set of pixels or to a convolution mask.

Figure 3:
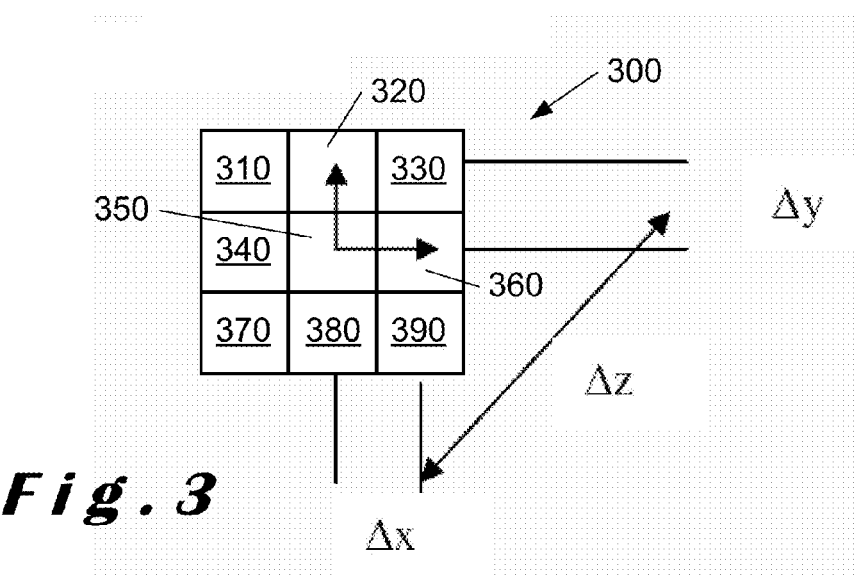
FIG. 3 illustrates a 3×3 kernel applied to the depth map to operate image processing such as deriving a normal map from horizontal and vertical gradients.

In particular, with respect to one embodiment illustrated by FIG. 3, a 3×3 grid array 300 comprising nine grid elements, or pixels 310, 320, 330, 340, 350, 360, 370, 380, 390, namely the kernel, can be applied as a convolution mask to the depth map to perform the determination for each pixel of the $\Delta Zx$ and $\Delta Zy$ depth gradients along respective ones of the X- and Y-axes. From these gradients, a local surface orientation for each pixel and a corresponding normal among some other operations are then approximated.

Figure 4:
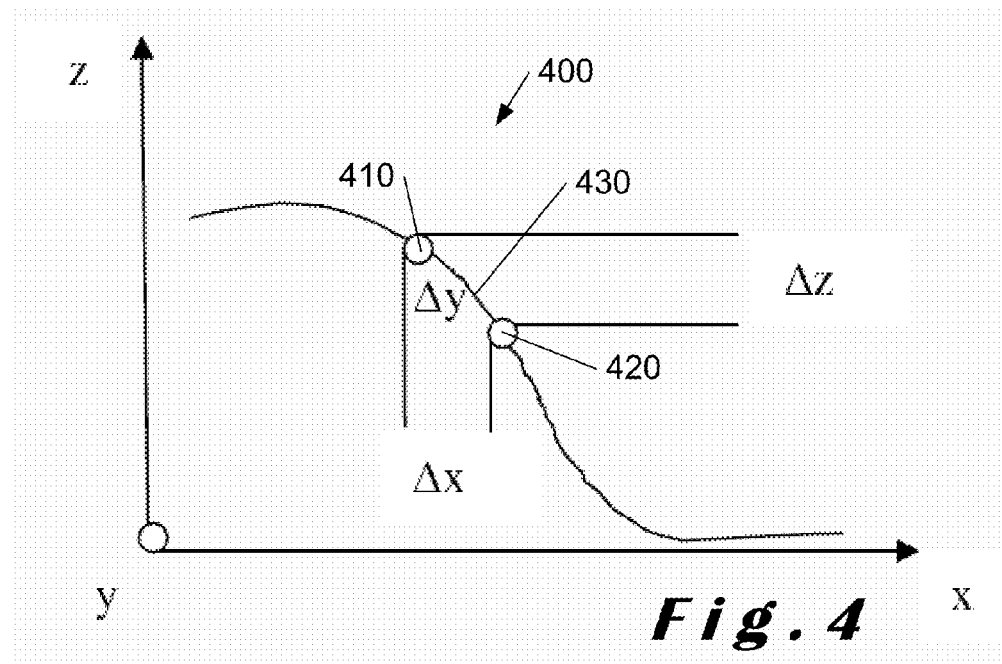
FIG. 4 illustrates a top view of a depth map showing depth $\Delta Zx$ and $\Delta Zy$ gradients along respectively the Z- and X-axes with respect to two adjacent grid elements of the grid array of FIG. 3.

FIG. 4 illustrates a top-down view 400 of a 3D scene having an object having a surface 430, the object being imaged in a depth map. Applying the convolution mask 300 of FIG. 3 to that depth map permits the determination of depth gradients for each pixel. For example, if considering only the X axis in a single dimension, the object point 410 is imaged in the kernel by the pixel 350, and the imaged point 420 in the depth map is imaged in the kernel by the pixel 360. The depth gradient $\Delta Zx$ in between points 410 and 420 representing $\Delta X$ at point 410 can then be determined. The same operation can be performed with respect to the Y axis and the point 320 of the kernel to determine $\Delta Zy$ at point 410. $\Delta Zx$ and $\Delta Zy$ at point 410 are then used as input to approximate a local plane orientation for each pixel and from which a normal can be extracted.

The initialisation step 210 further comprises determining or refining the position of the centre of mass of the 3D point cloud. The centre of mass can be determined in many ways which will be apparent to a person skilled in the art.

The initialisation step 210 further comprises determining or refining the principal direction of the user which can be obtained using as for example a principal component analysis (PCA) of the 3D point cloud.

The initialisation step 210 further comprises determining or refining the position of the head by using a suitable method known to a person skilled in the art.

Apart from refining and determining input data, the initialisation step 210 also aims to set a realistic initial position of the skeletal representation according to the 3D point cloud of the user in order to provide a right starting point for the following fitting and tracking steps when no skeletal representation as been previously performed. The initialisation does not require that the user/object to be tracked stands in a specific pose, but requires an unambiguous relative position in between the user/object parts, for example but not restrictively, no arms crossed, no legs crossed, all limbs visible with as few as possible occlusions. The simpler the pose of the user/object, the faster the pose initialisation will converge to a correct skeletal representation pose. This pose initialisation step includes the following sub-steps:—

1) Preparing inputs
2) Determining best head candidates
3) Extrapolating a torso; and
4) Determining the initial skeletal pose In relation to preparing inputs, statistics relating to a set of points of interest, namely the key points, uniformly scattered around the user 3D point cloud are collected, for example, using the centroids generated by a clustering algorithm to determine information, such as, position, number of pixels, first and second order motion data, connectivity of centroids, adjacency of regions, neighbouring centroids, distances between the neighbouring centroids, etc. Angles can also be determined between each key point and each combination of pairs of its neighbours; the key points and/or centroids are classified into one of three categories as described in more detail below, to be used in the pose identification process; and determining a principal direction of the body of the user, for example, by using head localisation techniques combined to mass centre position, by using line fitting techniques, or by using PCA or similar plane/shape fitting algorithm, or by using the key points classified as belonging to the torso.

The three categories are defined as being one of: an 'extremity', namely, a potential head, hand or foot; a 'limb', namely, a potential elbow or knee, leg or arm; and a 'torso'. The 'extremity' category includes key points and/or centroids having a very sharp angle, and/or only one and/or no neighbours. The 'limb' category includes key points which are not extremities and centroids located in between two neighbours. The 'torso' category includes key points and/or centroids which are not classified as being an extremity or a limb.

The head candidates are determined using a suitable head detection algorithm. The determination of the head candidates requires that the following conditions are satisfied: the candidate must be an 'extremity'; the candidate must be one of the highest points with respect to the real world coordinate system (assuming a calibration is present); the candidate must be connected to some points classified in the 'torso' category; and the candidate must be loosely aligned with the main body direction of the user.

For each potential head candidate, an extrapolated user torso is determined which comprises a pelvis position, left and right shoulders and left and right hips. The torso extrapolation is achieved by assuming the user is standing, getting the user height from the highest head candidate point, and defining the torso proportions and scale according to the user height. These initial proportions are only used by the initialisation step and can be modified later by a skeleton fitting optimisation loop into which the real dimensions of the user may progressively be refined.

Using each individual key point or centroid previously classified, a skeletal representation initial pose is to be considered as being a specific arrangement of the control points that best fit the classified key points and/or centroids. The skeletal representation, namely, the control points must thus be fitted and/or matched according to the respective positions of the identified key points and/or centroids.

The method that determines the initial pose detection aims to minimise the number of pose evaluation while making full use of the information computed previously. In one embodiment, the pose detection may be an exploration-exploitation strategy or a full backtracking exploration.

In order to determine a pose, each key point and/or centroid is associated with a body part: head, torso, left and right arms, and left and right legs. These associations are generated using the initial key point classification made in the pose estimation step 210 described above (preparing the input), but is not necessarily limited to it. When an association is performed, an evaluation of the configuration of the specific arm or leg is retained, if and only if, it satisfies some canonical human articulations and morphological constraints. By performing these evaluation steps as soon as possible during processing dramatically reduces the search space to explore. The complete pose that will be kept is the one that offers the maximum satisfying associations of key points and/or centroids with body parts.

For example, in one embodiment, the top-down backtracking exploration may start from any identified head candidate and the corresponding torso key point candidates. A potential compatible full body pose is then determined by exploring the other key points, basically the limbs, by using various strategies or combination of various strategies:

(i) In a first strategy, each key point classified as being an 'extremity' may be explored as being a potential foot and/or a hand. A region adjacencies graph (RAG) comprising information about key point connections may then be used to search for elbows and knees in between the potential candidates corresponding to hands and feet, and the closest torso key point candidates to which they are linked.

(ii) In another strategy, the key points belonging to the 'limb' category may also be explored as being potential elbows or knees, the RAG may additionally be used to search for or to help in validation of potential hands and feet candidates from the potential elbows and knees candidates.

In one further embodiment, varying specific exploration strategies may be conditionally performed alone or in combination with other strategies. For example, one specific strategy may be used for searching for a best key point candidate arrangement when the user most probably stands with straight arms along the body.

In another further embodiment, additional constraints may be used to exclude false pose candidates by using specific constraints applied to the control point arrangement with respect to the key point positions. For example, articulation limits and loose limbs length constraints may be considered to accept or refuse a pose candidate.

Returning to FIG. 2, the pre-setting step (step 220), comprises generating, prior to the fitting and tracking step 230, an orthographic projection of the depth map in a grid having a predetermined amount of pixels or bins. Each of these bins collects information relating to the 3D points corresponding to the object to be fitted and tracked. This information may be depth measurements, IR illumination values, normal vectors and/or statistical modes of these measurements, values and/or vectors etc.

The collection of the information into the bins is performed by storing the data corresponding to the 3D points of the object into the bins. Each bin may collect information from several 3D points of the object depending on the distance of these points in the space from the imaging device, such as, an imaging sensor or a camera. This is because the 3D point cloud is sampled by a 2D imaging sensor, the resolution of which is static, resulting in the 3D space not being sampled with the same accuracy at distances further from the imaging sensor or camera when compared to distances close to the imaging sensor or camera. For example, at 5 m from the imaging sensor or camera, an acquired point may corresponds to a 7 cm surface in the real world, whilst at 1 m from the imaging sensor or camera, an acquired point may corresponds to a 1.5 cm surface in the real world. By the way, predetermining a sampling step of fixed dimension for the data projection into the bins, for example, of 5 cm, will also lead to different amounts of data being collected into the bins according to the distance of the projected 3D points with which they are associated from the imaging sensor or camera.

This means, for example, that one single point at a distance of 5 m from the imaging sensor can be projected into one single bin of the grid in the orthographic projection and at least three points at a distance of 1 m may be projected into a single bin of the grid in the orthographic projection. This also means that the closer the points are from the imaging sensor, the more accurate the orthographic grid will be as more points will be entering each bin of the grid.

Because of the orthographic projection in a grid, the image that is being processed is of a fixed size regardless of the distance of the object from the camera. This means that a constant processing time can be achieved by determining a convenient fixed grid size which will be independent of the distance of the object from the camera. In most instances, there is a trade-off to optimise processing performance, that is, processing time and processing quality.

In a preferred embodiment of the present invention, the orthographic projection is not performed onto the whole depth map but preferably on a restricted area thereof defined by using the user mask image, the orthogonal re-projection grid being centred onto the mass centre of the user. The result of this process may be called an orthographic user or ORUS. When performing the re-projection, several pixels of the initial 3D point cloud may point to the same single cell element, namely, a bin, within the orthographic grid whilst some other cell elements or bins in the ORUS grid may be empty.

The data provided by ORUS comprises an image for which each pixel or cell or bin contains: an estimation of the normal corresponding to the initial 3D point cloud points associated with an ORUS cell; a minimum Z-coordinate value, that is, a statistical mode which can be the minimal depth value of the depth map pixels projected into a single bin of the ORUS grid; and an average value of the X, Y and Z coordinates of the 3D point cloud points projected in the grid pixel.

Figure 5:
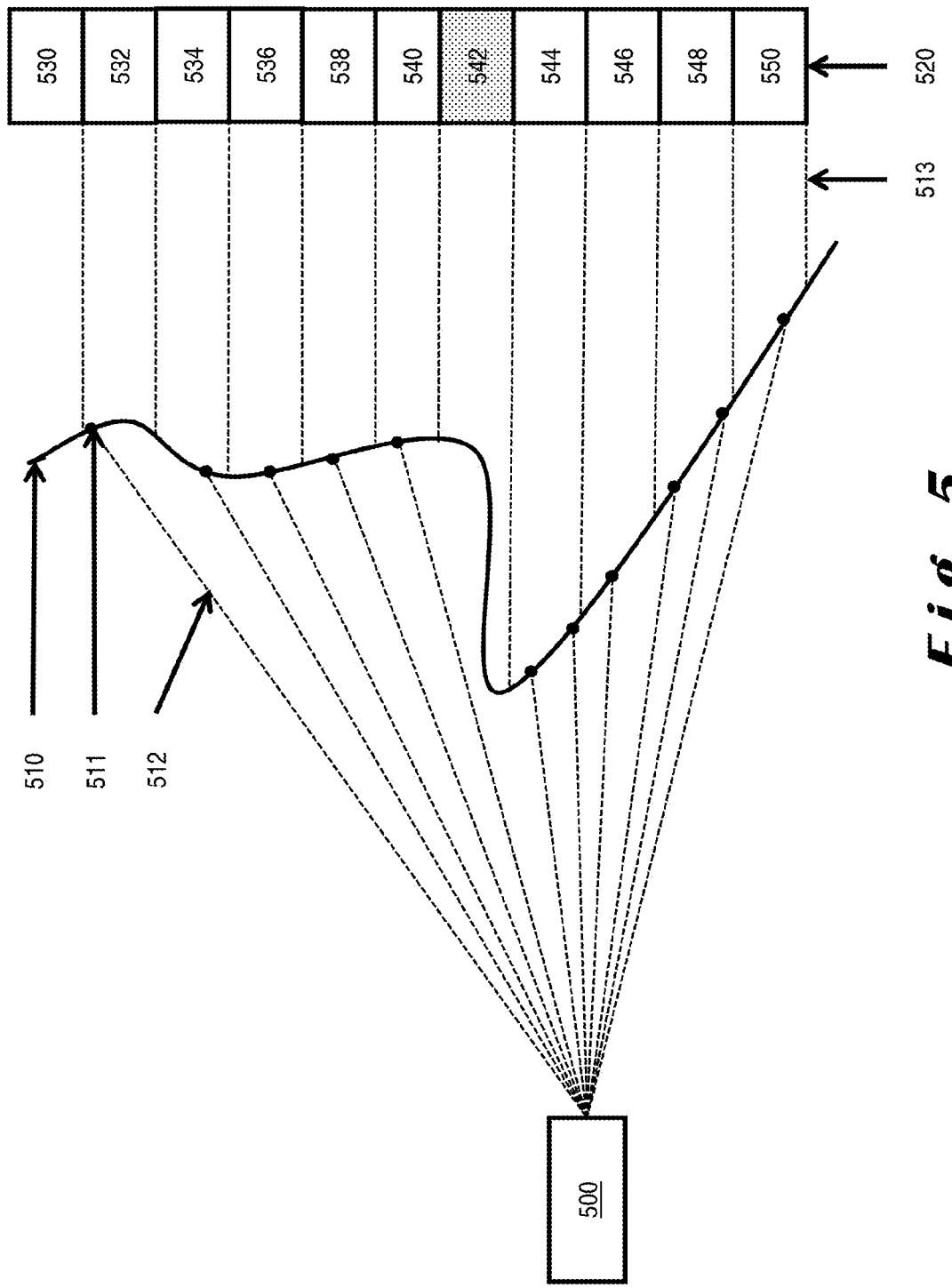
FIG. 5 illustrates a bin filling principle as part of a user point cloud projection into an orthographic representation.

In FIG. 5, an example illustrating the ORUS re-projection method principle is shown. Camera 500 captures a scene including an object 510 to be tracked. In this case, the object 510 is indicated by a curve as shown. The object 510 is sampled by the depth sensing capturing process and each sampled point 511 corresponds to a projection 512 from the object 510 to the sensor matrix array of the camera 500. It will be appreciated that there are several sampled points, the number being defined by the resolution of the depth sensing system, but only one is labelled in FIG. 5 for clarity. The projection 512 is determined by the type of imaging device or camera used, including not only resolution of the depth sensing system but also its field of view. The ORUS process orthogonally projects, as indicated by projection 513, each sampled point of the curve or object 510 into a fixed step size projection grid 520 which comprises a plurality of bins 530, 532, 534, 536, 538, 540, 542, 544, 546, 548, 550. Only one line of the grid 520 is shown in FIG. 5 as it corresponds to a sectional representation in the vertical plane. Each bin 530, 532, 534, 536, 538, 540, 542, 544, 546, 548, 550 of the grid 520 accumulates sampled points from the observed object 510 and contains at least one value indicative of the depth values of the curve. Each bin 530, 532, 534, 536, 538, 540, 542, 544, 546, 548, 550 may also contain a value of the corresponding normal as described above with reference to FIGS. 3 and 4. By way of example, bins 530, 532, 534, 536, 538, 540, 544, 546, 548, 550 contain a depth value but bin 542 is empty and therefore corresponds to a hole or an occlusion created by the re-projection of the object 510. In the same way, bins 548 and 544 comprise data extracted from two sampled points from the scene by the camera system.

In one preferred embodiment, the empty bin of the ORUS grid may be re-populated using interpolation techniques using one statistical mode, for example, an average of the data of each sampled point in the neighbouring bins. In this case, bin 542 can be re-populated with an interpolated value corresponding to the values in bin 540 and 544. The interpolated data values comprise at least a depth value, and a normal value. In another embodiment, a triangulation of the depth map can be performed, and, the triangles can be projected in the ORUS grid and filled with any triangle rasterisation method, for example, using scanline rendering, an algorithm for visible surface determination, in 3D computer graphics, that works on a row-by-row basis rather than a polygon-by-polygon or pixel-by-pixel basis.

Figures 8A, 8B:
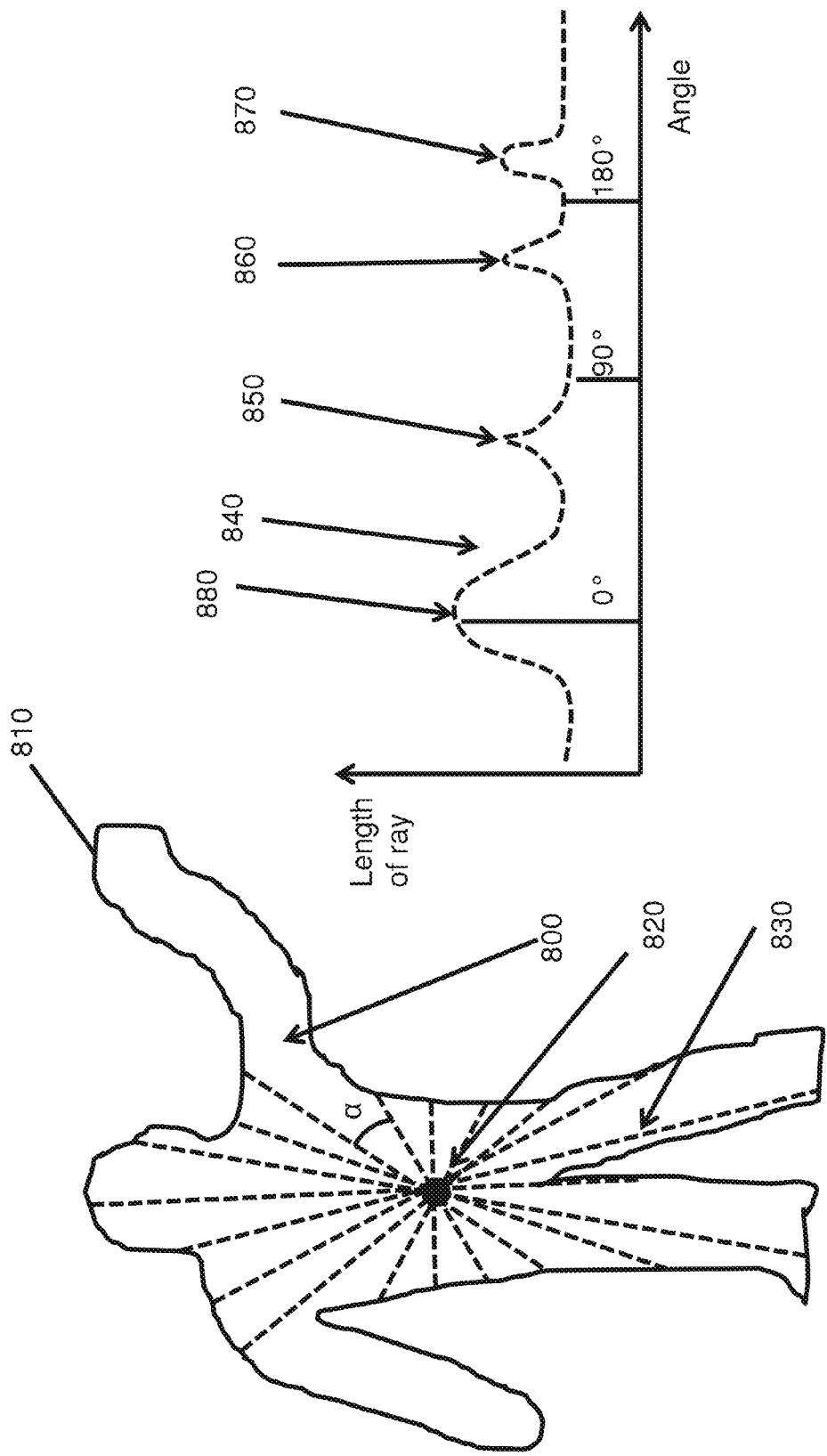

Using the ORUS projection, the 3D point cloud corresponding to the user can be processed to determine or refine a principal direction of the user body as shown in FIGS. 8a and 8b. In FIG. 8a, a user shape 800 having an outline 810 is shown. The user shape 800 has a centre of mass 820. Rays 830 from the centre of mass 820 are extended to the boundary of the user shape 800, as indicated by the outline 810. Only one ray 830 is labelled in FIG. 8a for clarity. Each ray is spaced from an adjacent ray by a suitable angle, $\alpha$. Angle $\alpha$ may have any suitable angle, for example, 2°, 5° or 10°, depending on the number of distance measurements that are to be determined from the centre of mass 820 to the outline 810. The distance measurements are then plotted against angle in a diagram as shown in FIG. 8b.

In FIG. 8b, a profile 840 is shown which corresponds to the plot of distance measurements or length of ray from a reference point, for example, from the centre of mass 820 of the user, to the outline 810 against angle. The profile 840 has a number of peaks 850, 860, 870, 880 which in this case, correspond to respective ones of the extended arm of the user, his/her two legs, and his/her head.

With respect to illustration FIG. 8b, the head is determined to be the peak 880, that is, the nearest peak to the 0° position which is determined, for example, by the principal direction of the user body. The legs are determined to be the peaks 860, 870 that are located on either side of the 180° position, that is, substantially opposite to the head position. The extended arm is determined to be the peak 850 between 0° and 90°. The peak corresponding to the position of the head could also be determined as being between two peaks corresponding to the shoulders (not shown).

The other arm in this case cannot be determined from the length of a ray 830 as it is effectively occluded by the torso portion of the user shape 800. However, it will be appreciated that if the user was standing in a different position, for example, with both arms extended, the position of the other arm could be determined as a peak between 270° and 0° (not shown).

In one preferred embodiment, diagram mode based statistical analysis is carried out for determining or refining the position of the head within the 3D point cloud of the user with respect to all of the modes detected. Additionally, identifying some non-ambiguous configuration of the distribution of the modes is useful for recovering from tracking errors associated with the head position or the global pose. For example, symmetry of the potential head mode with respect to potential shoulder modes is to be considered. In a similar way, limbs mode specification is to be considered. In another example, two separate modes with similar height amplitude and being adjacent by less than thirty degrees in the top-down direction may better correspond to the legs of the user with the other modes potentially better corresponding to the head and to the arms; the head mode being preferably the one localised in between the two modes representing the arm. In a particular embodiment, the head position provided by another process may be reset or refined to be in a more suitable position corresponding to one point of interest or centroid attached to the user 3D point cloud defined through mode statistical analysis.

From this determination or refinement of the user head position, a principal direction can be determined or refined as being the one which passes, in a straight line, from the head centre to the centre of mass 820, and down to a position between the feet according to the FIG. 8a.

Returning to FIG. 2, in step 220, the ORUS data are then used in a next step to determine the curvature centre points. In particular, curvature centre point position estimation is performed by using normal vectors, namely, normal data of the ORUS grid, to determine intersections of the normals at a local level so as to estimate curvature centre points which are the points that correspond to the central points of sections of the parts of the object. Data relating to positions of the curvature centre points are accumulated in the ORUS grid, and the location having a maximum of density of the accumulation of these curvature centre points are then set as those defining the best approximation of the central axis of the part of the object (namely, the bones for the limbs in case of the fitting and tracking of a human being). In particular, each maximum density location has a centre and a radius which together define parameters of an osculating sphere. In addition, each osculating sphere is classified, for example, as being a positive, negative or null curvature point with respect to the convergence of the points of the curve C from which it is extracted. In a preferred embodiment, the so-defined osculating spheres and their parameters are used for approximating central axes of the user body bones, user body bones volume, the torso plane, and for enriching and/or redefining the principal direction of the body.

Figure 6:
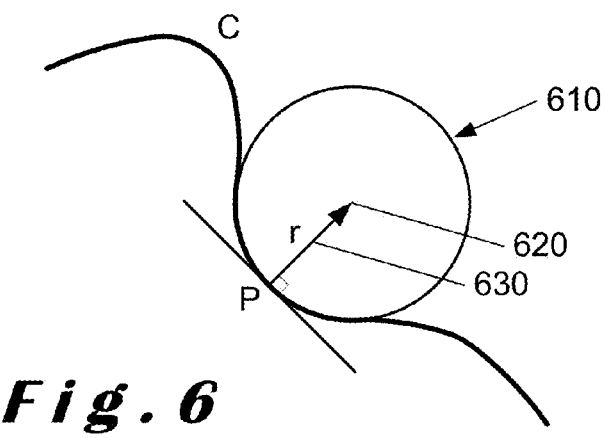
FIG. 6 illustrates a 2D view of an osculating sphere used for representing the volume of the central axes of body parts of a user, the centre of the osculating sphere corresponding to a curvature centre point approximated from the normal map.

In FIG. 6, an example of an osculating sphere is illustrated in 2D. A sphere 610 having contact with a curve C at a point P, the centre of which lying in a normal plane to the curve at the point P is defined as an osculating sphere. In this case, for a surface defined by curve C, the osculating sphere 610 can be drawn so that its centre 620 lies on the normal line, indicated by arrow 630, to the surface C at point P, the centre 620 corresponding to a maximum of density of the intersections of the normal of the curve C projected in the ORUS grid. The centre 620 of the osculating sphere provides an indication of the position of the centre axis or line of a potential body bone. By associating together the centres of all of the osculating spheres attached to a body, one can obtain or refine an estimation of the configuration of the skeletal representation.

As described above, it is to be noted that osculating spheres and the curvature centre points they are associated to can be of three types depending on the convergence of the surface with which they are associated, namely, the ones having a positive radius corresponding to concave surfaces which are discarded in the current embodiment; the ones having small radius values close to zero indicating flat surfaces which can be at least partially a torso; and the ones having a negative radius corresponding to tubular structures, for example, limbs of a user, which are particularly considered in the current embodiment. If the radius of the osculating sphere is initially determined by the distance between the curvature centre point and the P point, it is to be understood that it may also be predefined.

From the data determined in step 220, an iterative local and global fitting in accordance with a specific tracking technique is then performed (step 230) using topological and geometric constraints. The local fitting aims at re-positioning each control point of the skeletal representation from its previous position with respect to its expected position determined in the 3D point cloud, for example, fitting the head control point onto the position of the head determined from the 3D point cloud or preferably from the ORUS grid analysis. By "previous position", it is meant the position of the control points of the skeletal representation and their arrangement in space at one of the previous frames, preferably using the previous frame, if the skeletal representation of the object was previously fitted and tracked. If it the skeletal representation of the object was not previously fitted and tracked, the previous position is determined using the initial pose of the skeletal representation of the object to be fitted and tracked. It is understood that the skeletal representation at the previous frame used as an input for the current skeletal pose representation may also be enriched by using motion estimation techniques, for example, those using at least one of first order, second order and third order of a kinetic moment parameter, namely, the position, the velocity and the acceleration of the control points at the previous frame. The global fitting aims at re-positioning globally all control points of the skeletal representation with respect to one another and with respect to a determined global pose.

Consideration of topological constraints includes taking into account sets of connected points having determined inter-relations, for example, the patch 140 illustrated in FIG. 1 representing the torso of a user which is a set of 4 connected points. Additionally, upper and lower arms, upper and lower legs are considered as being sets of two connected points. In particular, when considering the user head position with respect to the torso, a set of connected points corresponding to the neck is considered as a triangular organisation of three control points linking the head to the centre of the segment between the two shoulders.

Consideration of geometrical constraints includes: minimum and/or maximum distances between two connected control points, for example, the length of the upper and lower limbs as well as the length of the neck are constrained. Constraints between two non-connected control points can also be considered, for example, the distance between head and hips. In particular, the geometrical constraints are used in order to limit effectively the pose estimation solution space made available by the topological constraints, and in order to simplify the fitting as described in more detail below, for example, an orthogonality constraint can be enforced when considering the head and shoulders.

In one preferred embodiment, the distance between geometrical constraints of the control points of the skeletal representation are strengthened over time as the process collects reliable measurements. Strengthening can be carried out, for example, through mixture of Gaussian, or through temporal averaging. Reliable measurements can be detected at times when the pose of the skeletal representation contains no ambiguity, for example, when the user stands up in the scene in a way that permits perfect detection and identification of all of its extremities where no limbs are crossed and no parts of the body occluded.

In addition to the topological and geometric constraints, velocity and collision constraints are also considered to obtain a better estimation of the correct position of the skeleton representation control points, of the related segments and/or patches that must never effectively overlap or be merged together. In particular, velocity constraints are related to the speed of motion of the control points. They must be included into a predefined range of permitted velocities. A permitted velocity may be defined for each single control point of the skeletal representation. Lower velocities with respect to the predefined range are considered as being indicative of no movement. Higher velocities than those permitted are also considered as indication no motion. Any velocity out of the predefined range is therefore considered as no movement with the resulting being that the considered control point will keep the same position as it had in the previous frame.

Collision constraints relate to overlapping, to merging, and, to a certain extent, to the distance of one control point, segment and/or patch from another so that any overlapping between them is not permitted. By the term "not permitted", it is to be understood that the fitting process, for example, freezes the segment position at the latest authorised position, or adjust it at another position so that the posture satisfies the energy minimisation principle with respect of all the associated constraints. Since the global tracking step efficiency is dependent on the fitting accuracy, it is also dependent on the topological and geometric constraints over time. The initial pose estimation of the skeletal representation, step 210, proposed at least once at start-up or when no previous tracking was performed provides a step that assists in improving the efficiency of the tracking process as it delivers an unambiguous arrangement of the control points of the skeletal representation.

Coming back to the tracking step itself, it is based on a method which minimises an energy which can be a combination of different criteria, for example:

a distance to matter, that is, the distance from the skeleton to osculating sphere centres;

a distance from the current skeleton pose to the previous skeleton pose;

a distance to the user surface as seen by the imaging device, that is, the fact that the skeletal representation must be behind the user mask according to the depth and included within the silhouette of the user (this is termed "distance to silhouette").

Optimisations of the energy minimisation are carried out at two levels, namely, at a local level and at a global level. The process basically aims to find, for each control point of the skeletal representation, the local level position at which it minimises the global energy of the skeletal representation of which it is a part with respect to the constraints and criteria described above, that is, fitting the position of a control point at a new position which involves some potential changes in the positions of some of the other control points to which it is related with respect to the constraints. For example, a change in a position of the control point corresponding to a hand may change a little if the position of the control point corresponding to the elbow changes as the distance between these two control points is constrained by the forearm segment size. Optimisation is performed iteratively, for example, using an algorithm called a gradient descent or using a Levenberg-Marquardt like method. Once the convergence criteria are met in the iterative optimisation, meaning, for example, that the local optimisation is close to a local minimum, additional guided configuration modifications are then used in order to get out of the determined local minimum so that it is possible to try finding another configuration in which energy is lower than the one previously determined in the local optimisation step. Guided configuration modification aims then at performing a global optimisation on top of the local optimisation process. Several loops of local and global optimisation can be performed, whether they are in a row or not, so that convergence to a suitable skeleton pose solution that satisfies at least one or a combination of: reaching a minimal global energy; reaching a minimal local energy; reaching a predetermined number of iterations in the energy minimisation process; and/or reaching a predetermined time allocated for the convergence.

One preferred embodiment of the guided configuration modifications uses a specialised process technique that detects, for example, some known patterns in the state of the system, namely, a limited number of known user poses, and applies a predefined associated response, namely, a predefined skeleton pose or a predefined skeleton control point arrangement, aimed at better minimisation of the energy of the overall system.

In a more preferred embodiment, in order to improve the global fitting and tracking performances, each specialised process is weighted by probability factors, for example, at least one of: their occurrence ratio; their success ratio; and their minimisation efficiency ratio. The minimisation efficiency ratio corresponds to their respective speed performance in the minimisation process previously performed. A specialised process having a higher weight will be selected in preference, and prior to, any other specialised process having a lower weighting factor.

Figure 9:
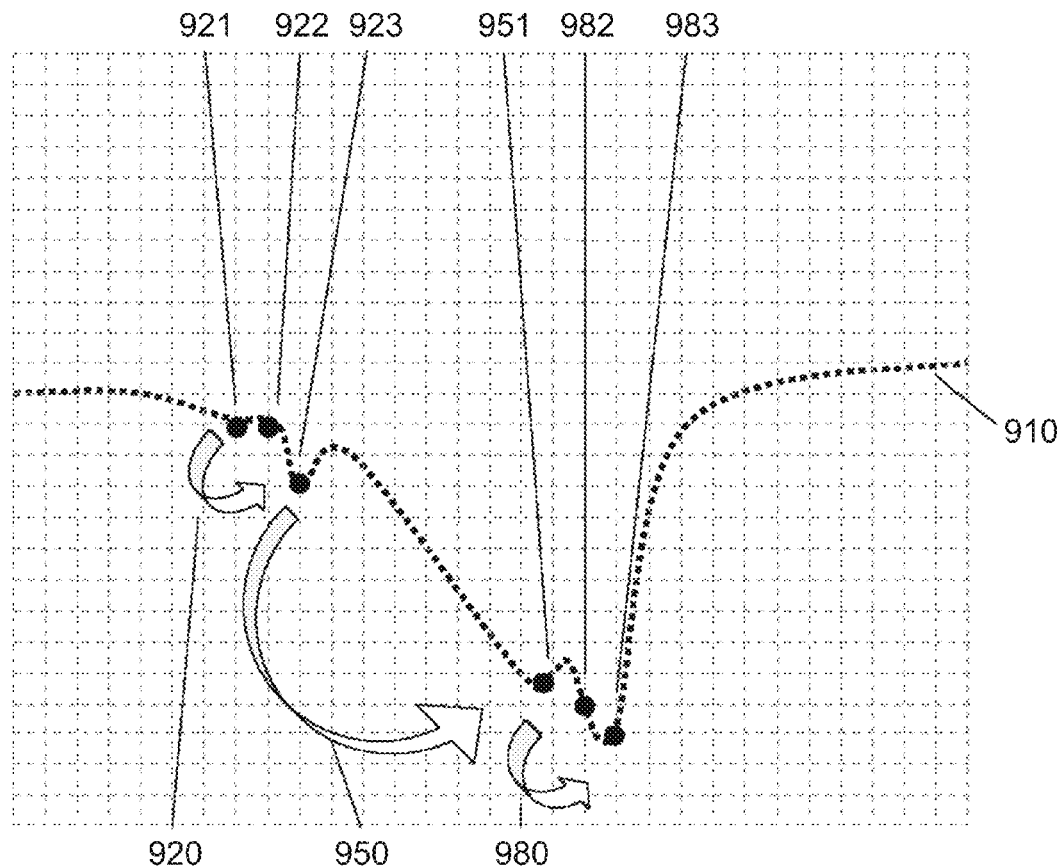
FIG. 9 illustrates the principle of iterative local and global energy minimisation used in the skeleton representation fitting and tracking process in accordance with the present invention.

In FIG. 9, the global energy of the skeletal representation, namely, the global energy corresponding to the distance of the control points of the skeletal representation and associated bodies (that is, the segments and the patch) with respect to the determined curvature centres, with respect to their previous positions and with respect to the user mask, is represented by the dashed bold line 910. It is understood that the shape of the line 910 is drawn only for illustrative purpose, and that it may vary significantly according from one user pose to another, and from one skeletal representation to another. For each frame, when entering the energy minimisation process (step 230 of FIG. 2), the global energy of the skeleton is determined as indicated by point 921. A local iterative energy minimisation process, as indicated by arrow 920, is carried out by parsing successively the relevant potential control point configurations for the skeletal representation, as indicated by points 922, 923, until a minimum energy is found for the skeletal representation as indicated by point 923. It is understood that the number of iterations may vary from one user pose to another and that a threshold in the number of permitted iterations may be set to avoid infinite loop or to limit the convergence time process.

Once a local minima as indicated by point 923 is found, the guided configuration modification process, as indicated by arrow 950, is used to get out of the minimum local determined at point 923 so that it is possible to find another control point of the skeletal representation whose relative configuration the energy of which is lower than the one that was found locally (point 923). In FIG. 9, the guided configuration modification process (arrow 950) assists in performing a global optimisation, the result of which is a configuration of the skeletal representation represented by point 951 having a lower energy than that at point 923. Although only one global minima search is illustrated in FIG. 9, it will be understood that this global energy minimisation may be iterated in the same way as the local optimisations including using parameters to optimise convergence accuracy with respect to allowed processing time.

Once a best global minimum is found, at point 951, another local minima optimisation process may be carried out as indicated by arrow 980, so that relevant local configurations of the skeletal representation are found using iterations as represented by points 982, 983, until a minimal local energy is found.

After iteratively performing local and global energy minimisation optimisation, an optimal configuration of the skeletal representation, as indicated by point 983, is found. This configuration of the skeletal representation is then considered as the one that corresponds to the optimal fitting, namely, the best control point arrangement of the skeletal representation that represents the best the real user pose.

The next step comprises applying a robust stabilisation filtering to the control point positions of the skeletal representation, step 240. Preferably, all of the control points are considered, but it will be appreciated that some of the points may not need to be considered if there has been no movement. A method for carrying out frame-to-frame stabilisation is described in WO-A-2011/080281 in which a series of measurements of a physical variable captured by a camera or other sensor is processed to provide a stabilised image. This processing comprises comparing the difference between the first and second measurements with a predetermined threshold value, and, if the difference is below that predetermined threshold, the second measurement is replaced with a corrected second measurement in which the difference has been reduced using a first filtering value. Similarly for the second and third measurements, if the difference is also below a predetermined threshold, the third measurement is replaced with a corrected third measurement having been reduced using a second filtering value which is lower than the first filtering value. This is repeated for all the skeleton control points which are to be considered so that to smooth the skeleton movements representation.

In the next step, step 250, a completion process is performed to provide estimations for the positions for at least some of the control points of the skeletal representation when no information is available for these particular control points, for example, when there is an occlusion on the three-dimensional point cloud that hides the corresponding control points of the skeletal representation. One particular example is when the hand of the user is aligned with the shoulder with respect to the optical axis of the depth sensing system, that is, the imaging sensor or the camera, causing at least the elbow to be hidden and which causes the 3D point cloud corresponding to the user not to have a point corresponding to the elbow. In that particular example, completion may comprise estimating elbow position based on the previous steps 230 and 240 where the tracking and stabilisation results are enriched by, for example, a latest known position of the control point of the skeletal representation being considered. In one preferred embodiment of the invention, completion of missing information uses at least one of: a Kalman-based position extrapolation, an inverse kinematic based position refinement, joint limits and gravity simulation.

In particular, when using the Kalman-based position extrapolation, the control point of the skeletal representation for which no information is available for optimising the energy minimisation process has a position set in accordance with its previous positions, velocity and acceleration. When using kinematic based position refinement, alone or in combination with a Kalman-based completion, the control point positions of the skeletal representation are reset, for example, with respect to their distance to their neighbouring control points. When using joint limits position refinement, alone or in combination with one of the other completion process, the control point positions of the skeletal representation are refined, for example, with respect to the angular limits allowed between each of them and each of their neighbours according to the physiological properties of the considered user (or object). When using gravity simulation based position refinement, alone or in combination with one of the other previous completion process, the considered control point positions in the skeletal representation are refined, for example, with respect to the gravity, that is, each position is adjusted to be lower than the previously estimated position in accordance with the elapsed time and an estimation of a predetermined weight assigned to the control point being considered. In particular, the weight predetermination of each control point may be carried out in relation to the size and dimensions of the user, the size and dimensions having been refined over time.

The final step, step 260, aims at providing an output that includes one of: a set of control points corresponding to a skeletal representation of a user within the field of view of the camera, as described above with reference to FIG. 1; and a set of 3D primitives, such as, segments, triangles, patches, that provides a skeletal representation of the user. The set of control points or 3D primitives may include 3D coordinate data, 3D orientation data, motion related data (at a different level), identification of the joints (control points as described above with reference to FIG. 1) or 3D primitives, and the status of the joints (control points as described above) or 3D primitives.

Although the method described with reference to FIG. 2 refers to a human user and the formation of a skeletal representation of such a user, it will be appreciated that the method can also be used for determining a skeletal representation representing any other object within the field of view of the imaging sensor or camera, and for fitting and tracking the skeletal representation of that object.

In addition, stationary objects can be tracked if the camera or other imaging device is moving relative to the scene being captured. In particular, any 3D information may be provided according to a coordinate system the reference or origin of which may be the camera location as well as another point within the scene, the reference point being static, for example, a point on the floor, or mobile, for example, a point on a tracked object.

The method of the present invention has the following advantages:—

(1) A fixed step grid is used for the orthographic projection. Such a grid effectively decouples processing time from image resolution, that is, processing time is substantially independent of image resolution.

(2) It is possible to scale between quality and performance when optimising the method. This is done, for example, by choosing the size of the ORUS grid and the number of specialised processes that run at each time interval.

(3) An approximation of a central axis of each bone in the segments is determined using a set curvature centre points defined by an estimation of the position in space where local normal vectors from the point cloud intersects.

(4) A fitting and tracking energy metric for a skeletal representation is defined and includes criteria to be satisfied.

(5) An original tracking strategy is used including local and global energy minimisation associated with specialised processes for determining pose estimations corresponding to local minima of the pose energy of the skeletal representation, and therefore permitting the determination of the minimum global pose energy.

(6) A stabilisation is applied on top of each determined control point position of the skeletal representation in order to smooth its movement behaviour with respect to time.

(7) A completion is used at the end to resolve ambiguous known poses.

Figure 7C:
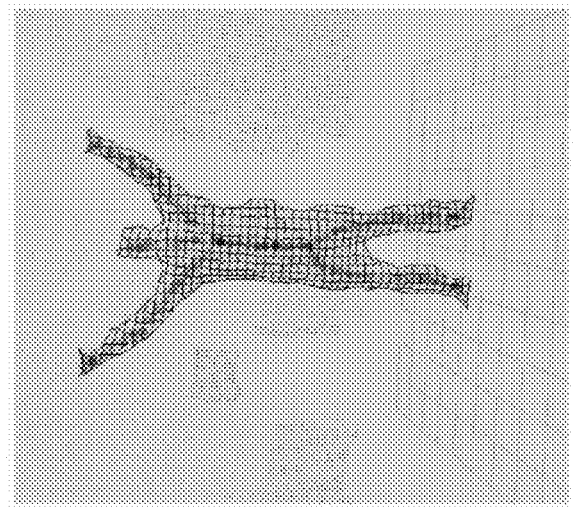
FIG. 7c illustrates a combination of the orthographic user grid of FIG. 7a and the curvature centre points and their associated osculating sphere of FIG. 7b.
Figure 7B:
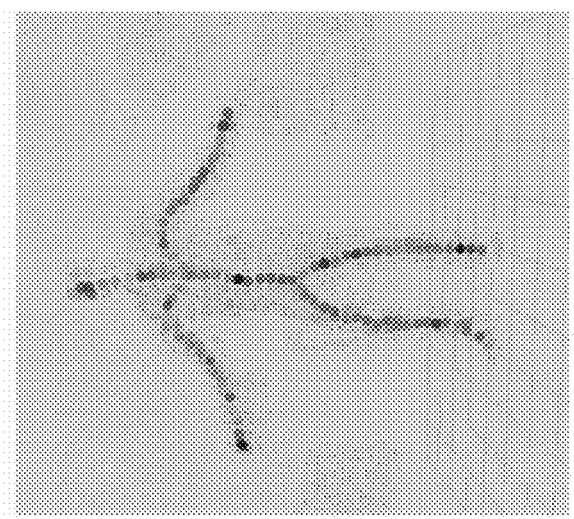
FIG. 7b illustrates the position of the curvature centre points and their associated osculating spheres in accordance with the present invention.
Figure 7A:
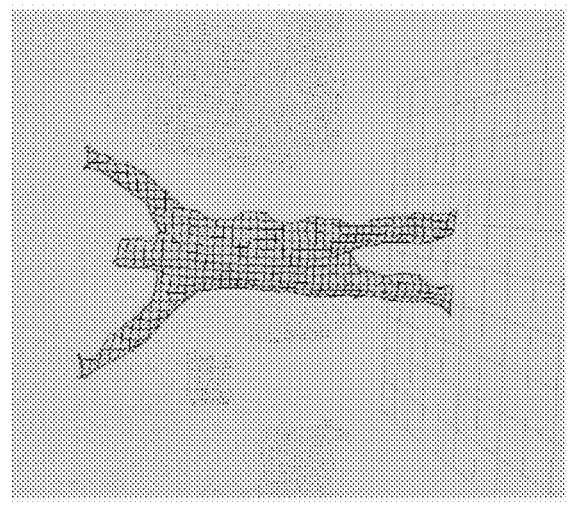
FIG. 7a illustrates an orthographic user grid (ORUS) in accordance with the present invention.

FIG. 7a illustrates an orthographic user grid (ORUS). Although the user appears to be a strange shape, this is due to the resolution of the camera or imaging device used to capture the 3D point cloud corresponding to the user.

FIG. 7b illustrates the position of the curvature centre points and their associated osculating spheres. As shown, the osculating spheres effectively provide what already looks like a skeleton while not being a replacement for such high level information as a skeleton.

FIG. 7c illustrates a combination of the orthographic user grid of FIG. 7a and the curvature centre points and their associated osculating spheres of FIG. 7b. As shown, the osculating sphere outline fits within the ORUS grid in a similar way to a skeleton model.

FIG. 7d illustrates the orthographic user grid of FIG. 7a where the osculating sphere outline is replaced by a skeleton as a result of the fitting process. As shown, the control points are visible but the patch 140 corresponding to the torso, as shown in FIG. 1, is not shown.

FIG. 7e illustrates a 3D point cloud corresponding to a user where curvature centre points determining the osculating spheres centre location are outlined to represent a tubular structure approximation of the bones of the user together with a skeleton model. Here, the user pose is similar to that shown in FIG. 7b. It is to be noted that the osculating sphere outline and the skeleton model are very similar because the skeleton is fitted on the osculating spheres as described above in accordance with the present invention.

The invention claimed is:

1. A method of fitting and tracking a skeletal representation of an object within a three-dimensional scene represented by a three-dimensional point cloud, the skeletal representation comprising an arrangement of a plurality of control points, the method comprising the steps of:
   a) using the three-dimensional point cloud of the scene to determine input information relating to the object to be fitted and tracked within the scene;
   b) converting the determined three-dimensional point cloud of the object to be fitted and tracked into an orthographic representation, the conversion comprising projecting the three-dimensional point cloud of the object to be fitted and tracked into a grid which comprises a plurality of grid bins, each grid bin having a predetermined size, the projection sampling the three-dimensional point cloud of the object with a predetermined static size in space;
   c) determining curvature centre points from normal data provided by the grid bins to estimate a central axis position of at least one part of the object to be fitted and tracked using the orthographic representation;
   d) determining the position of the plurality of control points representing the object to be fitted and tracked within the three-dimensional scene using the orthographic representation; and
   e) fitting and tracking the plurality of control points within the three-dimensional scene using the orthographic representation to refine the position of the skeletal representation of the object with respect to time.

2. A method according to claim 1, wherein the input information comprises a normal determined for each point in the three-dimensional point cloud.

3. A method according to claim 2, wherein step a) comprises determining a three-dimensional point cloud corresponding to at least one object of interest.

4. A method according to claim 3, wherein step a) comprises determining a principal direction of the object to be fitted and tracked.

5. A method according to claim 4, wherein step a) comprises determining an initial arrangement, in space, of the control point positions which defines a representation of a skeletal pose of the object to be fitted and tracked when no object has previously been fitted and tracked.

6. A method according to claim 1, wherein step a) comprises determining a three-dimensional point cloud corresponding to at least one object of interest.

7. A method according to claim 6, wherein step a) comprises determining a principal direction of the object to be fitted and tracked.

8. A method according to claim 7, wherein step a) comprises determining an initial arrangement, in space, of the control point positions which defines a representation of a skeletal pose of the object to be fitted and tracked when no object has previously been fitted and tracked.

9. A method according to claim 1, wherein step b) comprises accumulating and weighting information relating to each point in the three-dimensional point cloud in the grid bin with which it is associated.

10. A method according to claim 9, further comprising the step of, where a grid bin is empty, filling it with interpolated information from neighbouring populated grid bins.

11. A method according to claim 1, wherein step c) further comprises associating each curvature centre point with an osculating sphere to approximate a volume of the central axis of each part of the object to be fitted and tracked.

12. A method according to claim 11, wherein step c) further comprises associating each curvature centre point and its associated osculating sphere with a tag indicating the convexity of the surface of each part of the object to be fitted and tracked with which they are associated.

13. A method according to claim 1, wherein step d) comprises the step of:
   d1) fitting at least one segment between each pair of control points.

14. A method according to claim 13 wherein step d) comprises the step of:
   d2) identifying a plane in the three-dimensional point cloud of the object.

15. A method according to claim 14, wherein step d2) further comprises the step of:
   d3) identifying a plane in the three-dimensional point cloud of the object to be fitted and tracked using convexity tags.

16. A method according claim 15, wherein step d) further comprises the steps of:
   d4) identifying a principal direction of the object;
   d5) identifying the position of at least one part of the object; and
   d6) refining the position of each part of the object and principal direction with respect to one another.

17. A method according to claim 1, wherein step e) comprises utilising properties of identified control points to fit the position of the skeletal representation of the object to be tracked.

18. A method according to claim 17, wherein the utilised properties include at least one of: position, velocity, acceleration and probability factors determined with respect to time.

19. A method according to claim 18 wherein step e) comprises utilising a combination of local and global energy minimisation strategies for fitting the pose of the skeletal representation of the object with respect to time.

20. A method according to claim 19, wherein the energy minimisation strategies include at least one of: the distance to at least one osculating sphere centre; distance to previous skeleton; and distance to silhouette.

21. A method according to claim 20, wherein the energy minimisation strategies use all of the distance to at least one osculating sphere centre; distance to previous skeleton; and distance to silhouette criteria.

22. A method according to claim 21, wherein step e) further comprises evaluating a plurality of possible positions of control points in accordance with a probability factor determined with respect to time to optimise the result of fitting and tracking.

23. A method according to claim 22, wherein step e) comprises iteratively performing both local and global energy minimisation in accordance with at least one predetermined criterion.

24. A method according to claim 23 wherein the energy minimisation strategies are carried out using a gradient descent-type algorithm.

25. A method according to claim 1, wherein step e) comprises utilising a combination of local and global energy minimisation strategies for fitting the pose of the skeletal representation of the object with respect to time.

26. A method according to claim 25, wherein the energy minimisation strategies include at least one of the distance to at least one osculating sphere centre; distance to previous skeleton; and distance to silhouette.

27. A method according to claim 25, wherein the energy minimisation strategies use all of the distance to at least one osculating sphere centre; distance to previous skeleton; and distance to silhouette criteria.

28. A method according to claim 27, wherein step e) further comprises evaluating a plurality of possible positions of control points in accordance with a probability factor determined with respect to time to optimise the result of fitting and tracking.

29. A method according to claim 28, wherein step e) comprises iteratively performing both local and global energy minimisation in accordance with at least one predetermined criterion.

30. A method according to claim 29, wherein the energy minimisation strategies are carried out using a gradient descent-type algorithm.

* * * * *